United States Patent [19]
Ernst et al.

[11] 4,102,553
[45] Jul. 25, 1978

[54] ROLLER BEARING FOR LONGITUDINALLY MOVABLE MACHINE ELEMENTS

[75] Inventors: Horst M. Ernst, Eltingshausen; Manfred Brandenstein, Aschfeld; Armin Olschweski, Schweinfurt, all of Fed. Rep. of Germany

[73] Assignee: SKF Kugellagerfabriken GmbH, Schweinfurt, Fed. Rep. of Germany

[21] Appl. No.: 795,933

[22] Filed: May 11, 1977

[30] Foreign Application Priority Data

May 18, 1976 [DE] Fed. Rep. of Germany ... 7615699[U]

[51] Int. Cl.² ............................................. F16C 17/00
[52] U.S. Cl. ................................................. 308/6 C
[58] Field of Search ............. 308/6 C, 6 R, 3 A, 189, 308/207, 184, 185, 216, 217; 64/23.7

[56] References Cited

U.S. PATENT DOCUMENTS

| 3,797,897 | 3/1974 | Schaeffler | 308/6 C |
| 3,802,752 | 4/1974 | Koschmieder et al. | 308/6 C |

FOREIGN PATENT DOCUMENTS

2,121,847 11/1972 Fed. Rep. of Germany ....... 308/6 C

*Primary Examiner*—Trygve M. Blix
*Assistant Examiner*—Douglas C. Butler
*Attorney, Agent, or Firm*—Daniel M. Rosen

[57] ABSTRACT

A roller bearing for longitudinally movable machine elements, in which rollers run in and out of a load zone between entry and return paths, has at least one component that defines therein running-in and/or running-out areas which are made elastically yielding by slits which extend parallel to the path below the surface of the running-in and running-out areas.

10 Claims, 2 Drawing Figures

ROLLER BEARING FOR LONGITUDINALLY MOVABLE MACHINE ELEMENTS

BACKGROUND OF THE INVENTION

Roller bearings for longitudinally movable elements are well known, in which through-slits aligned transversely to the path are included in the running-in and running out areas of the bearing component that includes the path. Such known bearings have the drawback that the roll bodies, or rollers, when running in and out of the load zone, are compressed with uniform force over their entire length, so that the fulcrum or center of rotation during the aligning or turning of the obliquely running rollers, in and out of the load zone, will be indeterminate, and may lie on the total length of the line of contact between each roller and the surfaces of the path. During the aligning and turning of the rollers and in the running-in and running-out areas of the path, positioning forces of varying magnitude develop with resultant harmful impacts and oscillations and corresponding high wear of the paths. Furthermore, in a bearing part made elastically yielding by means of throughslits, the path will act like a unilaterally inserted leaf spring which, during operation, will easily oscillate and cause bothersome moving noises.

SUMMARY OF THE INVENTION

The objects of the invention are to provide an improved roller bearing of the aforementioned type, in which the roll bodies or rollers are uniformly and smoothly aligned in the running-in and/or running-out areas. Moreover, the roller bearing should run noiselessly.

These objects are innovatively attained by providing a pair of slits or slots in the roller part or block, in the vicinity of one or both of the running-in and running-out areas of the load zone of the roller path. These slits extend generally parallel to the path and are displaced in a direction normal to the path and inward from the load surface of the load zone; the slits of each pair extend transversely inward across the path, overlying the end sections of the rollers, with no slit present across the middle area of the path and the middle areas of the rollers. By this step, the path provided with slits is made laterally elastic and yielding in its running-in and running-out areas, whereas in the area between the opposite slits of each pair, the path will be rigid and relatively unyielding. When the roll bodies run in and out of the load zone, they will be more heavily loaded in their center section than in their end sections. Consequently, when these rolling bodies move along the path between lateral guide borders and/or otherwise are guided in said areas, they will be aligned without knocks or jerks. During this alignment of the rollers their center sections are held between loaded surfaces, as the rollers are turned around this center section, when only small friction forces to be overcome because of the less-loaded end sections of the rollers. With this structure wear will be reduced from harmful sliding friction of the rollers with the surfaces, and by large friction forces during the aligning of the roll bodies.

Furthermore, the bearing block including said slits will not oscillate, since the surface between the slits is rigid and unyielding, whereas the edges of the path provided with slits inward of its load surface, will act as a leaf spring which is clamped on its sides and end, which makes it relatively insensitive to oscillations.

According to further characteristics of the invention, the slits have depth in the running-in direction of the rollers into the load zone, which gradually decreases to zero. Likewise, the slits exhibit a lateral depth in the running-out direction of the roll bodies from the load zone, which gradually increases from zero to a maximal value. Accordingly, in the running-in area the rollers are gradually loaded over their entire length, and in the running-out area the rollers are gradually relieved of the load. Consequently, harmful loading and unloading impacts will not occur during the running-in or running-out of these rollers.

According to additional characteristics of the invention, the bearing component including these slits comprises a rotary block with continuously circulating roll bodies, which may be guided in an elastic cage, as of plastic. The roll bodies may have a cylindrical or spherical shape.

The invention will be illustrated below by means of two embodiments with pertinent drawings.

DETAILED DESCRIPTION OF THE PREFERRED EMBODIMENT

Figure 2:
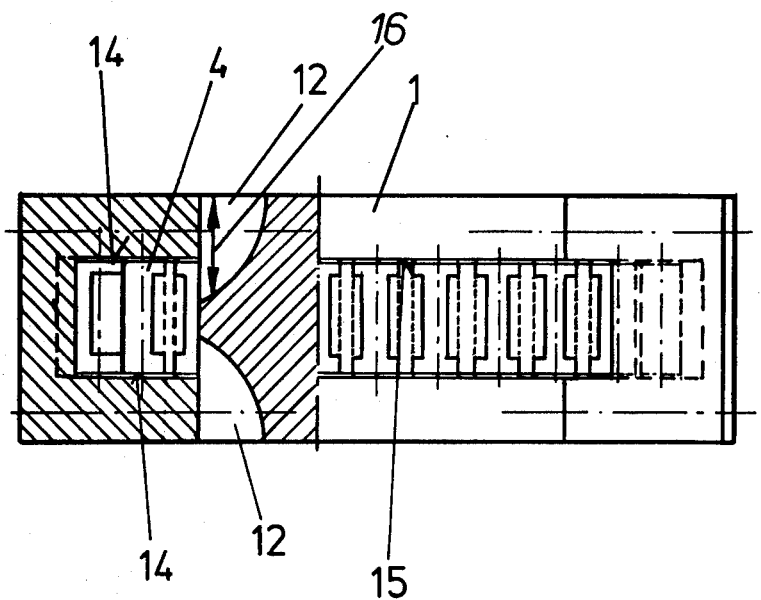
FIG. 2 shows a top view along line A—A of the roller bearing shown in FIG. 1.
Figure 1:
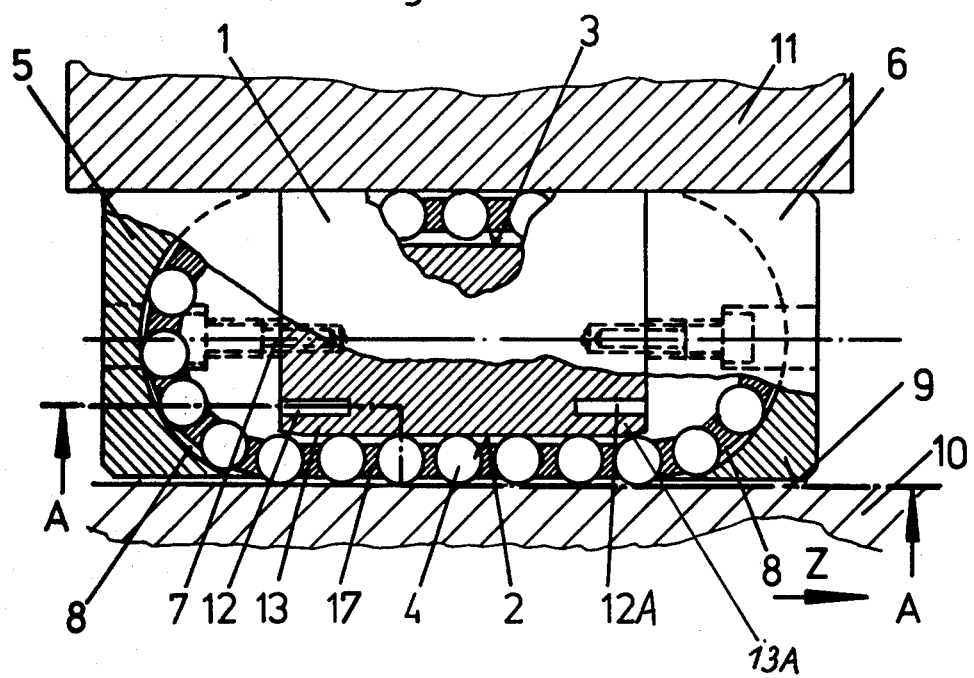
FIG. 1 shows a partial longitudinal section through a roller bearing according to the invention.

As shown in FIGS. 1 and 2 there is a rotary bearing block 1 which is longitudinally movable relative to machine element 10. Load surface 2 of block 1 and load surface 9 of element 10 define the loaded zone of the continuous path for rollers 4. Besides the loaded zone, the path includes a return portion 3 and guide channels 8 interconnecting the loaded zone and return path. Channels 8 are situated in end pieces 5 and 6 which are fastened by bolts 7 to the ends of block 1, which in turn is secured to frame or support 11. Pairs of slits or slots 12 and 12A, respectively, are provided in block 1 in the running-in and running-out areas of the loaded zone. As seen more clearly in FIG. 2, the slits of each pair are laterally opposite and overlying the end parts of the rollers in the loaded zone path, with no part of the slits overlying the central parts of the rollers.

With longitudinal movement of machine element 10, for example, in the direction of the arrow Z in FIG. 1, the rollers coming from the return channel 3 run through the guide channel 8 of the end piece 5, into the load zone between surfaces 2 and 9. Within the running-in area 13, the surface 2 is made elastically yieldable by slits 12, so that the rollers 4 at that area are less loaded at their end sections than in their center section. Consequently, these rollers can easily and without hindrance be aligned by moving about a fulcrum in their center section, as their end surfaces 14 move along the longitudinally aligned guiding borders 15 of the rotary block 1. As the rollers move into the running-in area in the longitudinal direction Z (see FIG. 1), the rollers become gradually loaded over their total length transverse of the surface 2. Indeed, as can be seen in FIG. 2, the lateral depth 16 of the slits 12 gradually decreases to zero in the running-in direction. In so doing the rollers will be smoothly aligned during the running-in. Since the rollers are relatively firmly held in their center section between the surfaces 2 and 9, no harmful oscillations and moving noises will occur.

After the rollers have run through the load zone bounded on top by surface 2 in the longitudinal direction Z (see FIG. 1), they approach and enter the guide channel 8 of the end piece 6, and from there go back into the return channel 3. At the end of the load zone is the running-out area 13A established by slits 12A formed similarly but opposite to the slits 12. Thus, the running-out area is elastically yieldable by the pair of laterally opposite slits 12A whose depth 16 gradually increases from zero to a maximal value in the direction Z. This will smoothly release the end parts of rollers as they move through the rolling-out area. According to the guiding pressure of the elastic cage 17, which may be made of plastic, these rollers can turn and align themselves without hindrance, and thus run jerk-free into the guide channel 8 of the end piece 6.

Within the framework of this invention, the above-described embodiments can, of course, be modified and changed. For example, the roll bodies can be spherical instead of cylindrical with a corresponding design of the surface 2 to be a groove of circular cross-section.

What is claimed is:

1. In a roller bearing for use between bearing surfaces of machine elements, the roller bearing including (a) a block having a top load surface and a bottom return surface and end and side surfaces adjacent said load surface, (b) a plurality of rollers distributed about said block along a continuous path which includes a load zone defined by said load surface and a first of said bearing surfaces, and (c) means for retaining said rollers in said path, said load surface having (i) length in the direction of movement of said rollers which extend transversely across said load surface, and (ii) running-in and running-out areas respectively where said rollers enter and leave said load zone, each roller having central and opposite end parts, and said running-in and running-out areas each having central and edge portions respectively underlying the central and end parts of said rollers, the improvement wherein said block has defined therein a first pair of generally symmetrical slots in the vicinity of at least one of said running-in and running-out areas, said slots extend along a plane generally parallel to said load surface and below said surface, each slot extends into said block lengthwise from one of said end surfaces and widthwise from an adjacent side surface with said slots being spaced apart in the width direction, the width of each slot is maximum at said end surface and diminishes to minimum at said adjacent side surface, whereby said slots generally underlie only said edge portions of the running-in and running-out areas, said edge portions are elastically yieldable, and loading on said rollers increases as they move through the running-in area and decreases as they move through the running-out area where said areas have said underlying slots.

2. A roller bearing according to claim 1 wherein said first pair of slots is only in the vicinity of said running-in area.

3. A roller bearing according to claim 2 wherein said block defines therein a second pair of slots similar to the first and situated in the vicinity of the running-out area.

4. A roller bearing according to claim 1 wherein the width of said slots diminishes to zero at said side surfaces.

5. A roller bearing according to claim 4 wherein each of said slots defines, in a plane parallel to said load surface, a three-sided pocket, of which two sides are open at adjacent end and side surfaces of the block and the third side is closed and defines a concave curve.

6. A roller bearing according to claim 1 wherein said return surface and the second of said bearing surfaces define a return zone of said continuous path.

7. A roller bearing according to claim 1 wherein said block comprises a middle part and two opposite end parts secured to the middle part, said middle part includes said load zone and a first portion of said return zone which lies generally parallel to and spaced from said load zone, and each of said end parts includes a guide channel for interconnecting ends of said load zone and said first portion of the return zone, thus forming said continuous path for said rollers.

8. In a roller bearing for use between bearing surfaces of machine elements, the roller bearing including (a) a block having a top load surface and a bottom return surface and end and side surfaces adjacent said load surface, (b) a plurality of rollers distributed about said block along a continuous path which includes a load zone defined by said load surface and a first of said bearing surfaces, and (c) means for retaining said rollers in said path, said load surface having (i) length in the direction of movement of said rollers which extend transversely across said load surface, and (ii) running-in and running-out areas respectively where said rollers enter and leave said load zone each roller having central and opposite end parts, and said running-in and running-out areas each having central and edge portions respectively underlying the central and end parts of said rollers, the improvement wherein said block has defined therein a pair of generally symmetrical slots in the vicinity of at least one of said running-in and running-out areas, said slots extend along a plane generally parallel to said load surface and below said surface, each slot extends into said block lengthwise from one of said end surfaces and widthwise from an adjacent side surface with said slots being spaced apart in the width direction, whereby said load surface overlying said slots is elastically yieldable and loading on said rollers increases as they move through the running-in area and decreases as they move through the running-out area where said areas have said underlying slots.

9. A roller bearing according to claim 8 wherein each of said slots defines a generally triangular shape in a plane parallel to said load surface.

10. A roller bearing according to claim 8 wherein said block is generally rectangular with generally parallel side surfaces and end surfaces, and each of said slots dfines in a plane parallel to said load surface, a three-sided recess, with two of the sides being open and the third side defining a concave curve.

* * * * *

UNITED STATES PATENT AND TRADEMARK OFFICE
CERTIFICATE OF CORRECTION

PATENT NO. : 4,102,553

DATED : July 25, 1978

INVENTOR(S) : Horst M. Ernst, et al

It is certified that error appears in the above—identified patent and that said Letters Patent are hereby corrected as shown below:

Column 1, line 57; change "when" to --with--.

Column 4, line 59; change "dfines" to -- defines --.

Signed and Sealed this

Twentieth Day of February 1979

[SEAL]

Attest:

RUTH C. MASON
*Attesting Officer*

DONALD W. BANNER
*Commissioner of Patents and Trademarks*